(12) United States Patent
McPherson et al.

(10) Patent No.: US 10,270,755 B2
(45) Date of Patent: Apr. 23, 2019

(54) AUTHENTICATED NAME RESOLUTION

(75) Inventors: Danny McPherson, Leesburg, VA (US); Joseph Waldron, Herndon, VA (US); Eric Osterweil, McLean, VA (US)

(73) Assignee: VERISIGN, INC., Reston, VA (US)

( * ) Notice: Subject to any disclaimer, the term of this patent is extended or adjusted under 35 U.S.C. 154(b) by 627 days.

(21) Appl. No.: 13/251,607

(22) Filed: Oct. 3, 2011

(65) Prior Publication Data
US 2013/0085914 A1 Apr. 4, 2013

(51) Int. Cl.
G07F 19/00 (2006.01)
H04L 29/06 (2006.01)
H04L 29/12 (2006.01)

(52) U.S. Cl.
CPC ...... H04L 63/0823 (2013.01); H04L 61/1511 (2013.01); H04L 63/083 (2013.01)

(58) Field of Classification Search
CPC ........ H04L 1/08; H04L 12/2856; H04L 12/50
USPC .............................................. 709/219; 726/7
See application file for complete search history.

(56) References Cited

U.S. PATENT DOCUMENTS

| | | |
|---|---|---|
| 5,721,827 A | 2/1998 | Logan et al. |
| 6,119,143 A | 9/2000 | Dias et al. |
| 6,154,777 A | 11/2000 | Ebrahim |
| 6,338,082 B1 | 1/2002 | Schneider |
| 6,560,634 B1 | 5/2003 | Broadhurst |
| 6,678,717 B1 | 1/2004 | Schneider |
| 6,684,250 B2 | 1/2004 | Anderson et al. |
| 6,728,767 B1 | 4/2004 | Day et al. |
| 6,769,028 B1 | 7/2004 | Sass et al. |
| 6,839,421 B2 | 1/2005 | Esparza et al. |
| 7,136,932 B1 | 11/2006 | Schneider |

(Continued)

FOREIGN PATENT DOCUMENTS

| | | |
|---|---|---|
| JP | 2005-086700 A | 3/2005 |
| WO | 2000014939 | 3/2000 |
| WO | 2006114133 A1 | 11/2006 |

OTHER PUBLICATIONS

Teddy Mantoro, Saiful Azhar Norhanipah, Ahmad Fakhrurrazi Bidin, An Implementation on Domain Name System Security Extensions Framework for the Support of IPv6 Environment, 2011 International Conference on Multimedia Computing and Systems (ICMCS), Apr. 7-9, 2011, pp. 1-6, IEEE DOI: 10.1109/ICMCS.2011.5945627.

(Continued)

*Primary Examiner* — Rokib Masud
(74) *Attorney, Agent, or Firm* — MH2 Technology Law Group, LLP

(57) ABSTRACT

A method, system, and computer-readable memory containing instructions include receiving a DNS request containing authentication information, validating the authentication information, determining an appropriate action to take based on the validating status, and taking the appropriate action. Actions may include responding with an individualized network layer address or service location address, delaying sending a response message, sending a network layer address or service location address corresponding to a site containing authentication information, and sending a response with a network layer address or service location address with a web address configured to mimic the website related to the requested resource.

32 Claims, 8 Drawing Sheets

(56) References Cited

U.S. PATENT DOCUMENTS

| | | | |
|---|---|---|---|
| 7,152,118 | B2 | 12/2006 | Anderston, IV et al. |
| 7,299,491 | B2 | 11/2007 | Shelest et al. |
| 7,367,046 | B1 | 4/2008 | Sukiman et al. |
| 7,533,266 | B2 | 5/2009 | Bruekers et al. |
| 7,542,468 | B1 | 6/2009 | Begley et al. |
| 7,565,402 | B2 | 7/2009 | Schneider |
| 7,720,057 | B2 | 5/2010 | Igarashi |
| 7,725,536 | B2 | 5/2010 | Douglis et al. |
| 7,796,978 | B2 | 9/2010 | Jones et al. |
| 7,864,709 | B2 | 1/2011 | Cheshire |
| 7,895,319 | B2 | 2/2011 | Statia et al. |
| 7,917,616 | B2 | 3/2011 | Trace et al. |
| 7,984,149 | B1 | 7/2011 | Grayson |
| 7,991,910 | B2 | 8/2011 | Richardson et al. |
| 8,037,168 | B2 | 10/2011 | Schneider |
| 8,224,994 | B1 | 7/2012 | Schneider |
| RE43,690 | E | 9/2012 | Schneider et al. |
| RE44,207 | E | 5/2013 | Schneider |
| 8,468,351 | B2 * | 6/2013 | Boesgaard Sorensen .................. G06F 21/55 713/168 |
| 8,489,637 | B2 | 7/2013 | Patil |
| 8,521,908 | B2 | 8/2013 | Holmes et al. |
| 2001/0042109 | A1 | 11/2001 | Bolas et al. |
| 2002/0073335 | A1 * | 6/2002 | Shuster ............. H04L 29/12066 726/7 |
| 2002/0099952 | A1 | 7/2002 | Lambert et al. |
| 2003/0103645 | A1 | 6/2003 | Levy et al. |
| 2003/0182447 | A1 | 9/2003 | Schilling |
| 2004/0039798 | A1 * | 2/2004 | Hotz ................. H04L 29/12066 709/219 |
| 2004/0128514 | A1 | 7/2004 | Rhoads |
| 2004/0210672 | A1 | 10/2004 | Pulleyn et al. |
| 2005/0044352 | A1 | 2/2005 | Pazi et al. |
| 2006/0192994 | A1 | 8/2006 | Tanimoto |
| 2006/0242321 | A1 * | 10/2006 | Hegde ..................... H04L 29/12 709/245 |
| 2007/0124487 | A1 | 5/2007 | Yoshimoto et al. |
| 2008/0016233 | A1 | 1/2008 | Schneider |
| 2008/0027809 | A1 | 1/2008 | Storm |
| 2008/0052758 | A1 | 2/2008 | Byrnes |
| 2008/0189774 | A1 | 8/2008 | Ansari et al. |
| 2009/0055929 | A1 | 2/2009 | Lee et al. |
| 2009/0113074 | A1 | 4/2009 | Statia et al. |
| 2009/0157889 | A1 | 6/2009 | Treuhaft |
| 2009/0158318 | A1 | 6/2009 | Levy |
| 2009/0182884 | A1 | 7/2009 | Datta et al. |
| 2009/0276803 | A1 | 11/2009 | Weaver |
| 2010/0005146 | A1 | 1/2010 | Drako et al. |
| 2010/0049872 | A1 | 2/2010 | Roskind |
| 2010/0057936 | A1 | 3/2010 | Roskind |
| 2010/0064047 | A1 | 3/2010 | Sullivan |
| 2010/0077462 | A1 | 3/2010 | Joffe et al. |
| 2010/0274970 | A1 | 10/2010 | Treuhaft et al. |
| 2011/0078292 | A1 | 3/2011 | Ananda et al. |
| 2011/0153831 | A1 | 6/2011 | Mutnuru et al. |
| 2011/0238192 | A1 | 9/2011 | Shah |
| 2012/0117621 | A1 | 5/2012 | Kondamuru et al. |
| 2012/0147834 | A1 | 6/2012 | Zisimopoulos et al. |
| 2012/0173684 | A1 | 7/2012 | Courtney et al. |
| 2012/0185914 | A1 | 7/2012 | Delco et al. |
| 2012/0191874 | A1 | 7/2012 | Robinson et al. |
| 2013/0018944 | A1 | 1/2013 | Shyamsunder et al. |
| 2013/0198065 | A1 | 8/2013 | McPherson et al. |
| 2014/0036897 | A1 | 2/2014 | Frydman et al. |
| 2014/0068043 | A1 | 3/2014 | Archbold |
| 2014/0149601 | A1 | 5/2014 | Carney et al. |
| 2014/0207835 | A1 | 7/2014 | Jellick et al. |
| 2014/0280963 | A1 | 9/2014 | Burbridge et al. |
| 2014/0282847 | A1 | 9/2014 | Black et al. |
| 2015/0074221 | A1 | 3/2015 | Kuparinen et al. |
| 2015/0295882 | A1 | 10/2015 | Kaliski, Jr. |

OTHER PUBLICATIONS

Kiril Lashchiver, Domain Name System Anomaly Detection and Prevention, Sep. 2010, Thesis of School of Engineering and Computer Science, The Hebrew University of Jerusalem; Jerusalem, Israel.

European Search Report dated Jan. 22, 2013, European Application No. EP 12 18 7127, filed Oct. 3, 2012, pp. 1-5.

Eastlake, Donald, "Domain Name System Security Extensions; draft-ietf-dnssec-secext2-07.txt," Dec. 1, 1998, vol. dnssec, No. 7, Dec. 1, 1998, 98 pages.

Non-Final Office Action dated Sep. 3, 2013, U.S. Appl. No. 13/836,682, filed Mar. 15, 2013, pp. 1-44.

Jeff Tyson, "How Encryption Works", Dec. 6, 2005, howstuffworks.com, retrieved from Wayback Machine http://web.archive.org/web/20051206043803/http://computer.howstuffworks.com/encryption/htm/printable, pp. 1-4.

Basu et al., "Persistent Delivery With Deferred Binding to Descriptively Named Destinations", MILCOM 2008—2008 IEEE Military Communications Conference, 8 pp.

Extended European Search Report dated Jun. 26, 2014, European Application No. 14159613.0 filed Mar. 13, 2014, pp. 1-8.

Non-Final Office Action dated Aug. 26, 2014, U.S. Appl. No. 13/836,682, filed Mar. 15, 2013, pp. 1-39.

Ingemar Cox et al., "The First 50 Years of Electronic Watermarking", EURASIP Journal on Applied Signal Processing, 2002, pp. 126-132.

Chandramouli et al., "Challenges in Securing the Domain Name System," www.computer.org/security/, The IEEE Computer Society, Jan./Feb. 2006, pp. 84-87.

But et al., "Evaluting the Impact of DNS and HTTP Session Characteristics on Consumer ISP Web Traffic," TenCon2005, http://caia.swin.edu.au, Nov. 2005, pp. 1-11.

C. Contavalli et al., "Client IP Information in DNS Requests", IETF Internet Draft, May 21, 2010, http://tools.ietf.org/html/draft-vandergaast-edns-client-ip-01, Retrieved from the internet on May 29, 2014, pp. 1-23.

O. Kolkman et al., "Architectural Considerations on Application Features in the DNS", IETF Internet Draft, Mar. 14, 2011, http://tools.ietf.org/html/draft-iab-dns-applications-01, Retrieved from the internet on May 29, 2014, pp. 1-24.

H. Kaplan et al., "DNS Extension for ENUM Source—URI", IETF Internet Draft, Dec. 11, 2007, http://tools.ietf.org/html/draft-kaplan-enum-source-uri-00, Retrieved from the internet on May 29, 2014, pp. 1-8.

Extended European Search Report dated Aug. 27, 2015, European Application No. 15163265.0, pp. 1-4.

Final Office Action dated Feb. 26, 2016, U.S. Appl. No. 14/252,483, pp. 1-23.

Non-Final Office Action dated Aug. 12, 2016, U.S. Appl. No. 14/252,483, pp. 1-20.

Non-Final Office Action dated May 26, 2017, U.S. Appl. No. 14/252,483, pp. 1-29.

Communication Pursuant to Article 94(3) EPC dated Sep. 15, 2017, European Application No. 12187127.1, pp. 1-5.

First Chinese Office Action dated Feb. 23, 2018, Chinese Application No. 201410148379.0, pp. 1-27 (Including English Translation).

Non-Final Office Action dated Oct. 30, 2015, U.S. Appl. No. 14/252,483, pp. 1-39.

* cited by examiner

AUTHENTICATED NAME RESOLUTION

TECHNICAL FIELD

This disclosure generally relates to Domain Name Service (DNS) resolution. In particular, this disclosure relates to methods and systems for authenticating DNS resolution requests and providing authentication dependent responses.

BACKGROUND

The DNS system utilizes a hierarchical structure to associate fully qualified domain names to a particular IP address in response to a DNS query. For example, if a user visits the website www.example.com on their computer's Internet browser, typically, the stub resolver on the computer would (1) first check its own DNS cache for a suitable response; (2) if not available in cache, query a recursive name server or possibly each level of the delegation graph from the root DNS server downward with the same information, expecting a reply. If the queried system has the information or is authoritative for the precise question, it provides a response or error. If it does not but knows who is, it provides a delegation/referral to the child that should have more precise information. To leverage larger caching mechanisms, a DNS resolver (recursive name server) may be used between steps (1) and (2). Because a DNS resolver services many users, it typically holds a larger cache, helping to reduce the load on root servers and registry servers and often minimize response times for users because it is commonly topologically closer to the client. A DNS resolver may also act as a recursive name server, handling the multiple transactions and following delegations/referral chains between different name servers to resolve the final IP address for the resource in question, simply passing the final answer back to the user's computer. A DNS resolver may ultimately provide in its response a network layer identifier or service location id, which in some instances may be the same.

Some DNS servers support basic filtering of DNS queries based on the source IP address of the original querying machine. For example, some servers may compare the source IP address to whitelists or blacklists of IP addresses and allow or disallow the IP address accordingly. Other servers may use the source IP address to approximate the location (geolocation) of the query source machine, and use this location information to customize the response by returning an IP address of a resource server that is thought to be closer in proximity than another. In all of these cases, generally, once the response is allowed, the DNS response returns the IP address (or network layer identifier or service location id) of a machine that will provide access to the resource server. This IP address, the network layer identifier and service location id, is resolved regardless of the status of the user's permission to ultimately use the resource.

For example, suppose a user visited a web site with a customized portal on it, such as mypage.example.com. If the user does not have a valid account with mypage.example.com, allowing the user to access the site at all may be unnecessary and poses a potential security risk through disclosure of the network layer identifier and locator for the resource. Even if the user does have an account with mypage.example.com, some mechanism must still be employed for the user to be identified and authenticated by the website.

Various means exist to authenticate a user that is requesting a resource. In a typical scenario, the user may have login credentials on a website, or a cookie associated with past exchanges of those credentials. The login credentials, once validated, authenticate the user, allowing access to member only or user specific resources. For example, a user visiting a bank's website may login to view information associated with the user's account.

One problem with this type of authentication is that, until the user is authenticated or identified, the resource resolution process typically acts in the same way for every user. Advanced networking mechanisms may be employed on the resource server to filter different types of requests before authentication, such as diverting network traffic based on the geolocation of a user's IP address, e.g., a user in Europe may be diverted to a server based in Europe.

Alone, these techniques are problematic for several reasons. One problem with these techniques is that in every instance the resource IP address (or the network layer identifier and service location identifier) is exposed. This is undesirable because the disclosed nature of the resolved IP address (or network layer identifier or service location identifier) exposes the resource to distributed denial of service (DDoS) attacks, probes of the software of the systems associated with the IP address for security weaknesses, or attempts to gain unauthorized access or control of user accounts or other resources normally accessed at that IP address (or network layer identifier or service location identifier). This situation is akin to, after receiving a knock on the front door, opening the door just a crack to see who is outside. If the person outside is malicious, once you open the door, the person may be able to get it in. It would be safer to verify who is standing outside before opening the door, or perhaps not to disclose your home address and what resources may be available there in the first place.

A method and system is desired that can perform authentication of a DNS requestor prior to returning an IP address (or network layer identifier or service location identifier), to in part ensure that the requestor has authorization to access to the ultimate resource before opening the door or disclosing the address. The following disclosure solves these problems and provides added conveniences and functionality to the name resolution process. For example, as described below, this pre-authentication system allows administrators to prescribe specialized behavior at the DNS level based on the authentication status of the requestor.

SUMMARY

A method, system, and computer-readable memory containing instructions include receiving a DNS request containing authentication information, validating the authentication information, determining an appropriate action to take based on the validating status, and taking the appropriate action. Actions may include responding with an individualized network layer identifier or service location identifier (such as an IPv4 or IPv6 network layer address), delaying sending a response message, sending an IP address (or network layer identifier or service location identifier) corresponding to a site containing authentication information, and sending a response with an IP address (or network layer identifier or service location identifier) corresponding to a web address configured to mimic the website related to the requested resource.

In an embodiment, the authentication information is added to the DNS resolution request by a device other than a device that originates the DNS resolution request. In some embodiments, authentication information includes one or more of: a source IP address, a username/password combination, an encrypted data package, and hardware identification information.

In some embodiments, authentication information is received from a resource server and the information is updated in the authenticating DNS server. In some embodiments the individualized network layer identifier or service location identifier may correspond to a one-time-use identifier or an identifier that is normally dedicated to a particular user.

In some embodiments, where identification information determines that the requestor has previously been denied access to the resource server IP address, the network layer identifier or service location identifier, and received a delayed response, subsequent DNS requests receive longer and longer delays before processing. In some embodiments, the authenticated user is classified into a class and, depending on the class, receives prioritized access to the resource server.

In some embodiments, a community authority trust may issue an authentication certificate confirming the identity of a user requesting the name resolution of a domain name. A user may use the authentication certificate to make the name resolution request. Once validated, the authentication certificate may be used by the authenticating DNS server to determine an IP address (or network layer identifier or service location identifier) to provide in response to the request.

In some embodiments, the DNS request and identification information may be logged along with the DNS response or other action taken. These logs may be analyzed for statistical data trends in requests and responses. The logs may also be analyzed to determine security trends among various source IP addresses, e.g., for identifying IP addresses or users that should be blacklisted.

In some embodiments, the outcome of the validation of the authentication information may be used to create billing information, enabling a service operator to bill a client for certain types of responses.

It is to be understood that both the foregoing general description and the following detailed description are exemplary and explanatory only and are not restrictive of the application, as claimed.

The accompanying drawings, which are incorporated in and constitute a part of this specification, illustrate embodiments of the application and together with the description, serve to explain the principles of the application.

DETAILED DESCRIPTION

Reference will now be made in detail to the exemplary embodiments. Wherever possible, the same reference numbers will be used throughout the drawings to refer to the same or like parts.

Figure 1:
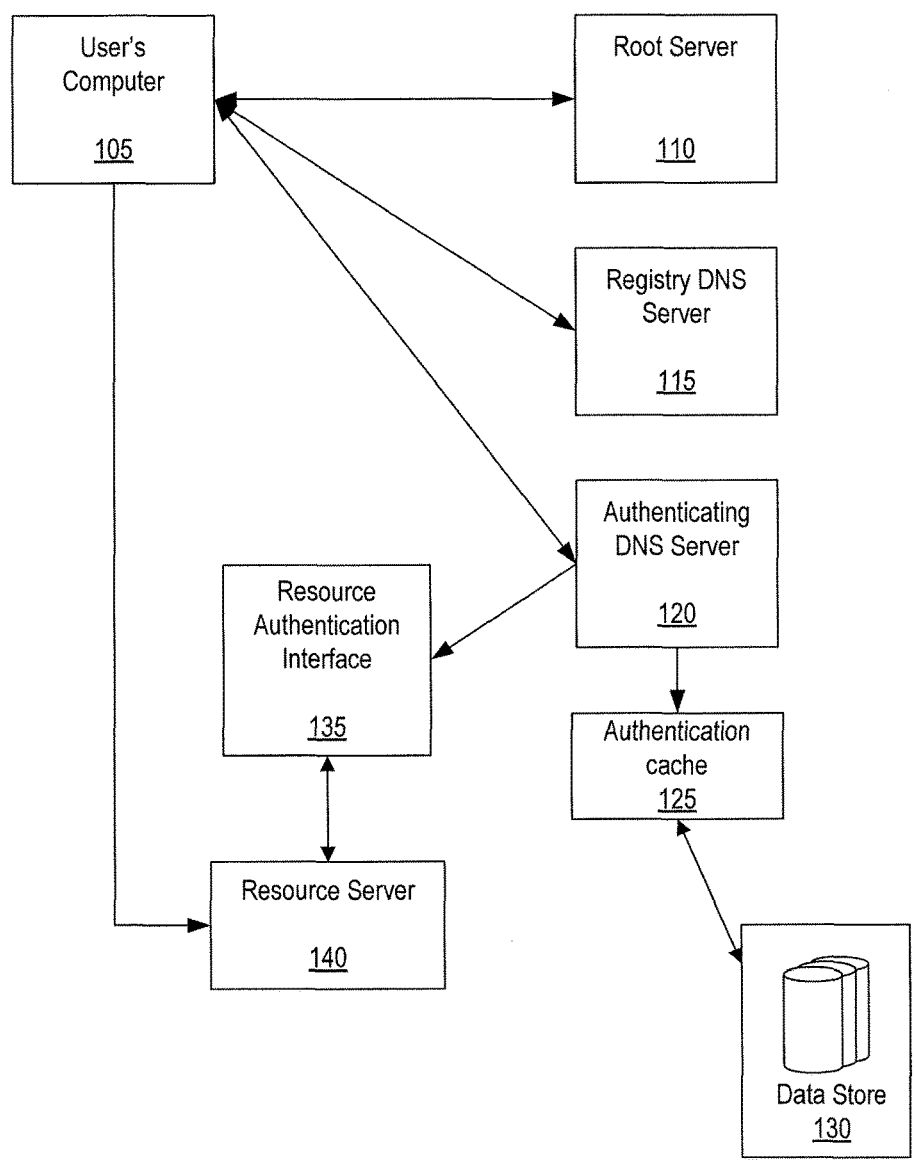
FIG. 1 illustrates an exemplary architecture demonstrating components that may be used to implement an authenticated resolution platform.

FIG. 1 illustrates an exemplary architecture (100) demonstrating components that may be used to implement an authenticated resolution platform. A user's computer (105) may instigate a DNS request. This request may be sent because the user visits a website, a program running on the user's computer initiates an online transaction, or any other possible reason that a user's computer would have the need to translate a fully qualified domain name, such as www.example.com, into its corresponding IP address. To begin the request, the user's computer (105) retrieves the name server information for the top level domain (TLD), e.g. "com," through a referral response from a root server (110). The root server (110) returns the response with the name server for the TLD (115). The user's computer (105) next queries the name server for the TLD (115) for the fully qualified domain name information for the domain, e.g., "example", and again receives a referral to the second-level domain authoritative name servers. The authoritative name server is the authenticating name server (120). In this example, the authenticating name server is authoritative to answer for the "www.example.com" fully qualified domain name and resolve it to the respective network layer address or service location address.

The authenticating name server (120) may have access to a localized caching system (125) to store both authentication information received from the user's computer (105), and authentication information received from the resource authentication interface (135), in a data store (130). The authenticating name server (120) interfaces with a resource authentication interface (135) to pass authentication credentials from the user's computer (105) to the resource authentication interface (135) and to receive a response with information regarding the authentication status of the user.

The resource authentication interface (135) may also interface with the resource server (140). For example, the resource server for the website address http://www.example.com would be the server configured to respond to http requests for www.example.com at one or more IP addresses. If the user's computer (105) is authenticated, then the authenticating DNS server (120) may return an IP address (or network layer identifier or service location identifier) to the resource server (140) to the user's computer (105). Then the user's computer may access the resource server by the given IP address.

One skilled in the art will appreciate that the architecture of FIG. 1 is merely exemplary. Other networking devices may be incorporated to manage traffic. In particular, one skilled in the art would recognize that firewalls, load balancers, additional mirrored servers (name server, resource server, and authentication interfaces), and certain name server caches may be incorporated into the network design and architecture. Further, one skilled in the art will recognize that additional hierarchical DNS servers may be queried, e.g., secure.www.example.com, and that interfaces and servers may be combined to be on one physical machine. For example, the resource authentication interface (135) may be physically and programmatically collocated on the same machine or machines as the resource server (140).

Further, although a DNS server on the Internet traditionally operates as returning an IP address, this function can be localized at higher IP layers for dedicated networks. For example a DNS server that returns a network layer identifier and a service location identifier may essentially be returning an IP address corresponding to a machine. However, a DNS server may also be understood to return a network layer identifier and service location identifier in the terms of a Uniform Resource Identifier (URI), identifying a particular layer and service location. One of ordinary skill in the art will appreciate that any mention of returning an IP address alone in this disclosure should be understood to alternatively and additionally include the possibility of distinguishing between an network layer identifier or service location identifier.

The authenticating DNS server (120) may interface with a security policy engine (not shown), either external or internal to the network. The security policy engine may inform authenticated resolution functions at the authenticating DNS server (120) or any other networking device that is designed to make use of security policies. An exemplary architecture illustrating such a use of a security policy engine as a community-based policy trust is described below in conjunction with FIG. 7.

Turning back to the authenticating DNS server (120), the authenticating DNS server (120) may be implemented in software as software modules or programs on one or more computing systems. For example, the functionality of the authenticating DNS server (120) may comprise one or more applications, which may comprise one or more computer units of computer-readable instructions which, when executed by a processor, cause one or more computers to perform steps of a method. In particular, the exemplary architecture in FIG. 1. may support execution of program code on one or more computers to accomplish the overall method. Computer-readable instructions may be stored on a computer-readable medium, such as a memory or disk. Such media typically provide non-transitory storage. One or more of the components depicted in FIG. 1. may be hardware components or combinations of hardware and software such as, for example, special purpose computers or general purpose computers. A computer or computer system may also comprise an internal or external database. The database may comprise one or more individual databases or databases configured to act together. The database may be implemented in a commercial, open source, or proprietary database program or may be contained in log files, flat files, or any other data storage mechanism. The components of a computer or computer system may, among other things, connect through a local bus interface or over a local or wide area network. The components depicted in FIG. 1 may be operatively connected to one another via a network, not shown, such as the Internet, an intranet, or any type of wired or wireless communication system. Connections may be implemented through a direct communication link, a local area network (LAN), a wide area network (WAN) and/or other suitable connections.

Figure 2:
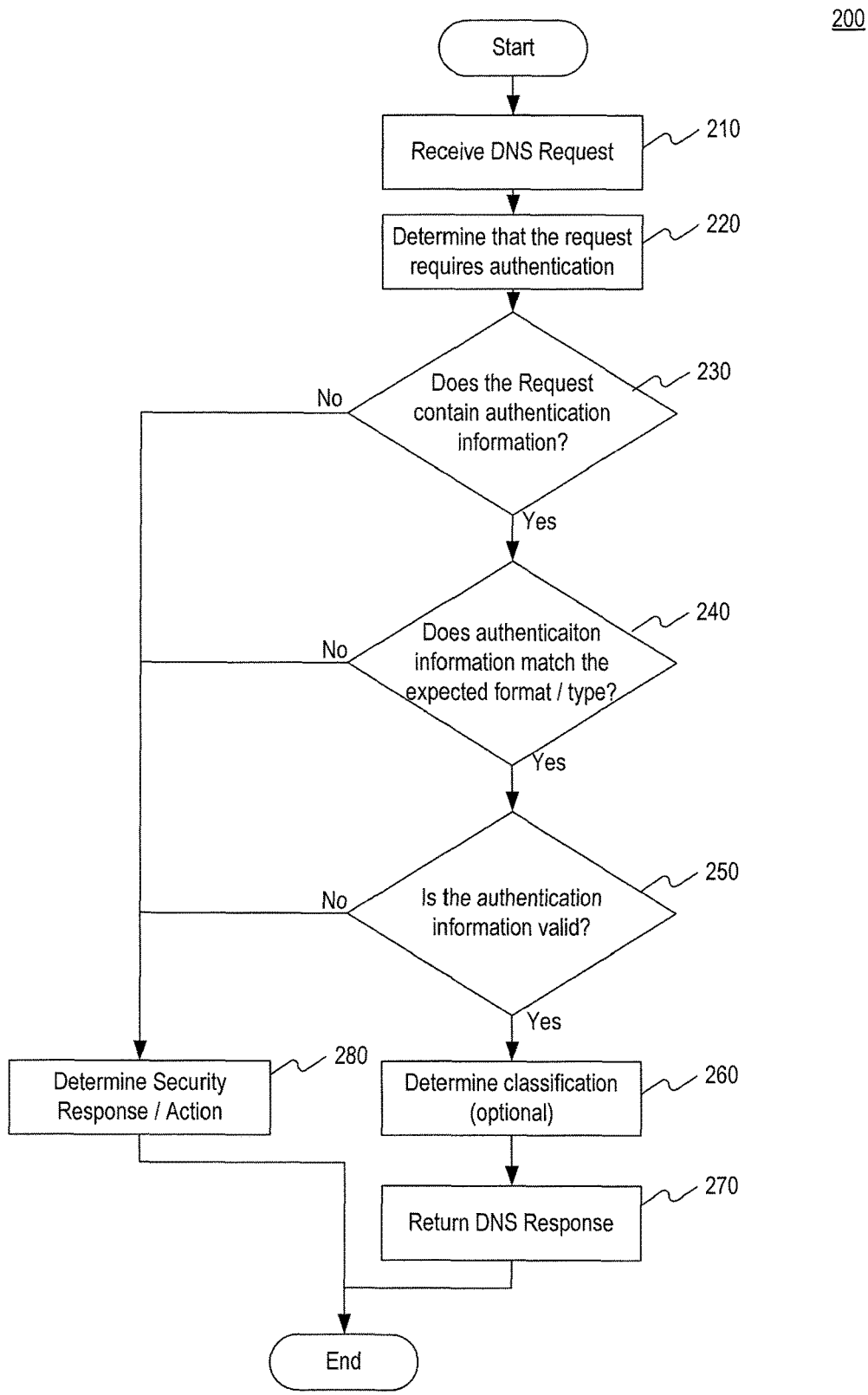
FIG. 2 illustrates an exemplary process of receiving a DNS request, authenticating it, and returning a response.

FIG. 2 illustrates an exemplary process (200) of receiving a DNS request, authenticating it, and returning a response. In step 210, the authenticating DNS server (120) receives a domain name resolution request for a domain name. As discussed above, the authenticating DNS server (120) is authoritative to respond for that domain name. The authenticating DNS server (120) examines the DNS request and determines that the request requires authentication in step 220. In particular, the authenticating DNS server (120) may be a multipurpose DNS server, acting both as an authenticating DNS server and a normal authoritative server. Thus, determining that the DNS request requires authentication allows the remaining steps of authenticating the request to proceed. If, in general operation, the DNS request did not require authentication, then normal DNS responding techniques would commence.

In step 230, the process may consider whether the DNS request contains authentication information. If it does, the process may consider, in step 240, whether the authentication information matches the expected format and type of authentication information. If the authentication is in the proper format and type, the process will consider, in step 250, whether the authentication information is valid. If in any of the previous steps, the DNS request did not contain authentication information, it was present but in the wrong format or type of information, or if the authentication process was invalid, then an appropriate security action or response may be determined in step 270. The security action or response step will be discussed in more detail below. One skilled in the art will appreciate that steps 230 and 240, in particular, are optional and interchangeable, and are presented to demonstrate a means of culling out DNS requests before presenting them to be authenticated in a validation process. Other traffic management techniques may also be applied, such as whitelisting/blacklisting techniques and other such traffic management techniques according to known or yet to be discovered traffic management techniques.

If the DNS request is authenticated, the authenticated user or requestor may be classified into a particular class of user as in step 260. More will be discussed about classifications below. As noted in FIG. 2, step 260 is also optional. A response to the DNS request is returned to the user's computer (105) in step 270. If any of the tests failed, resulting in an unauthenticated request, a security action and response is determined as in step 280.

Figure 3:
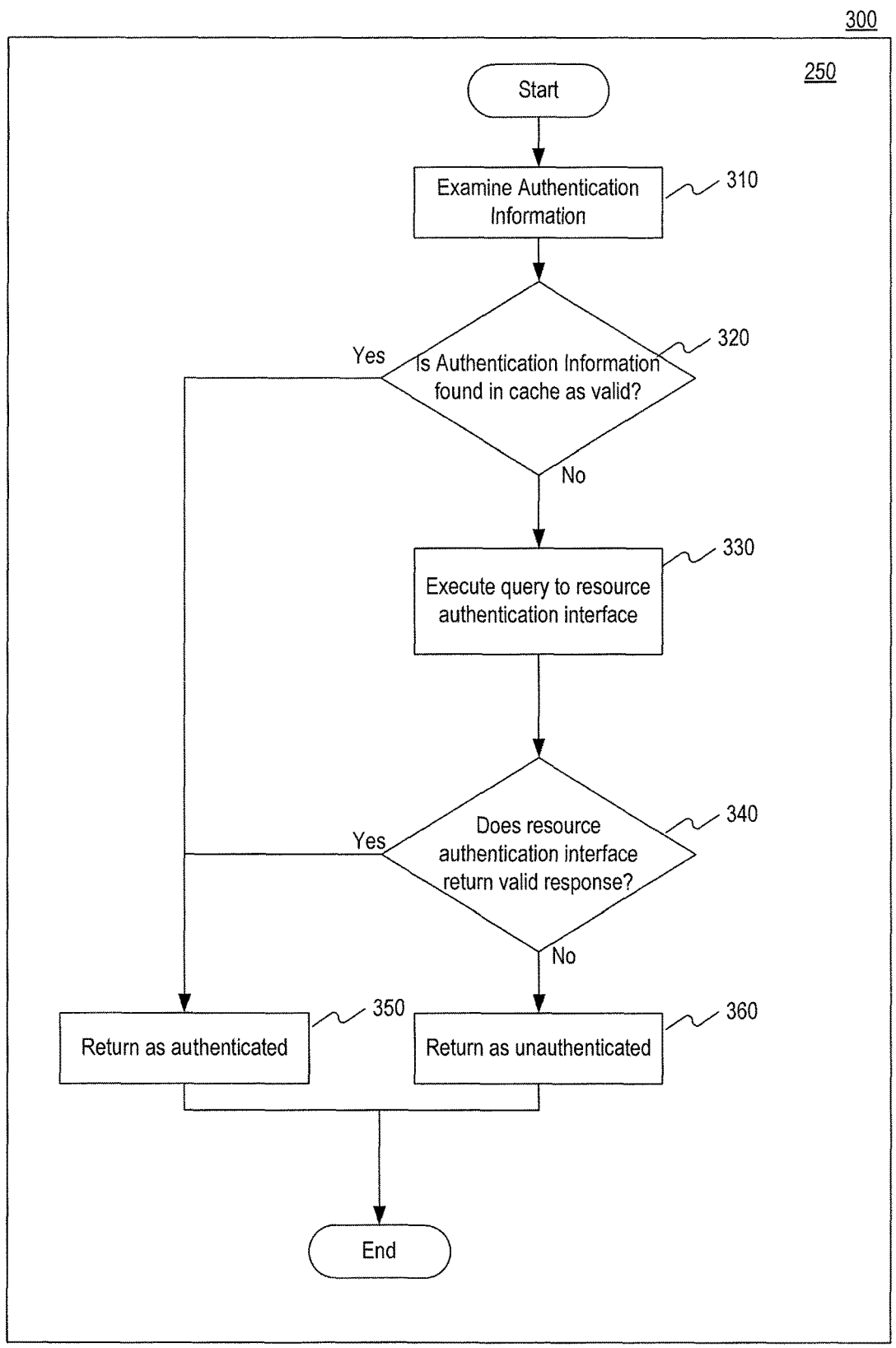
FIG. 3 illustrates an exemplary process of validating authentication information supplied in a DNS request.

FIG. 3 illustrates an exemplary process (300) of validating authentication information supplied in a DNS request corresponding to in exemplary step 250. The authentication information is examined in step 310. The authentication cache (125) is examined to determine whether the user has been recently authenticated in accordance with implemented caching guidelines in step 320. If so, then the authentication cache may validate the user as authenticated in step 350. If not, then the authenticating DNS server (120) may query a resource authentication interface (135) to determine whether the authentication information is valid as in step 330. If the resource authentication interface (135) returns valid in step 340, then the user is determined to be authenticated. Otherwise, the user is determined to be unauthenticated as in step 360.

Authentication information covers an entire gamut of information that may be supplied in the DNS request or detected from the DNS request. Attributes provided by the requesting user in the DNS request include such things as an IP address, MAC address, reputation data, username/password, encryption schemes, hardware keys, geolocation information, fingerprint identification, encrypted packages using private/public key authentication schemes, machine hardware IDs, product or license IDs, security policy certificates, or any other imaginable user-identifying information in the DNS query itself.

In one embodiment, authentication information may, instead of authenticating a particular user, authenticate a particular user as belonging to a group. In another embodiment, authentication information may be inserted by a packet monitoring device after the DNS request leaves the user's computer. For example, a corporate computer may send a DNS request which is then intercepted before leaving the corporate network, and updated by inserting authentication information in the request.

In another embodiment, the authentication information may be some data that has been encrypted by a private key in a PKI infrastructure. The authenticating server would then decrypt the data using a previously transmitted public key corresponding to the user's private key. Verifying the data authenticates that the user that encrypted the data is the expected user. For example, the authenticating DNS server may recognize the source IP address of a particular user, but require further proof through the above outlined PKI key pair encryption/decryption scheme. Further, the authenticating DNS server may encrypt the DNS response using its own private key, having provided the public key to the user's computer.

One skilled in the art will appreciate that other combinations of authentication information may be included to provide one or more indicia that the user's computer is the device it claims to be and that the user is allowed to receive a DNS response. Authentication information may also show that the user's computer is being operated by a particular user, thereby actually authenticating the particular user. For example, authentication information can include information pertaining to the identity of the user, such as name/password combinations and the like.

Figure 4:
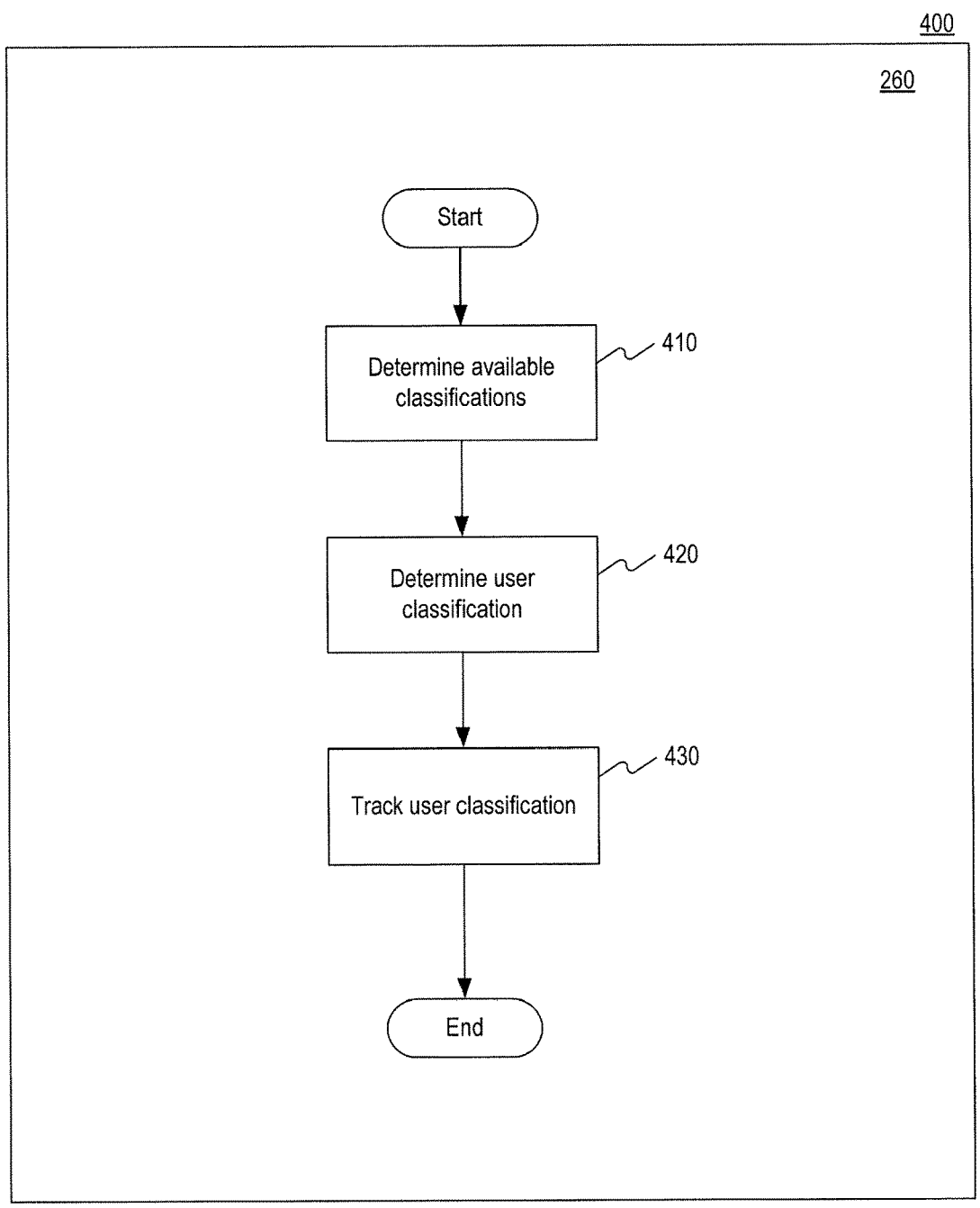
FIG. 4 illustrates an exemplary process of classifying a user based on authentication information.

FIG. 4 illustrates an exemplary optional process (400) of classifying a user based on authentication information corresponding to exemplary step 260. In step 410 the process determines available classifications for the particular resource requested. Exemplary classifications include such things as a "high," "middle," or "low" priority user; a governmental user; an emergency professional user; a high-traffic user; a free user; a paid user; a premium user; a guest user; and so on. A user may be classified into one or more of the available classifications in step 420. In step 430, the classification of the user is tracked so that the classification information may be used later in the process of returning a DNS response.

Figure 5:
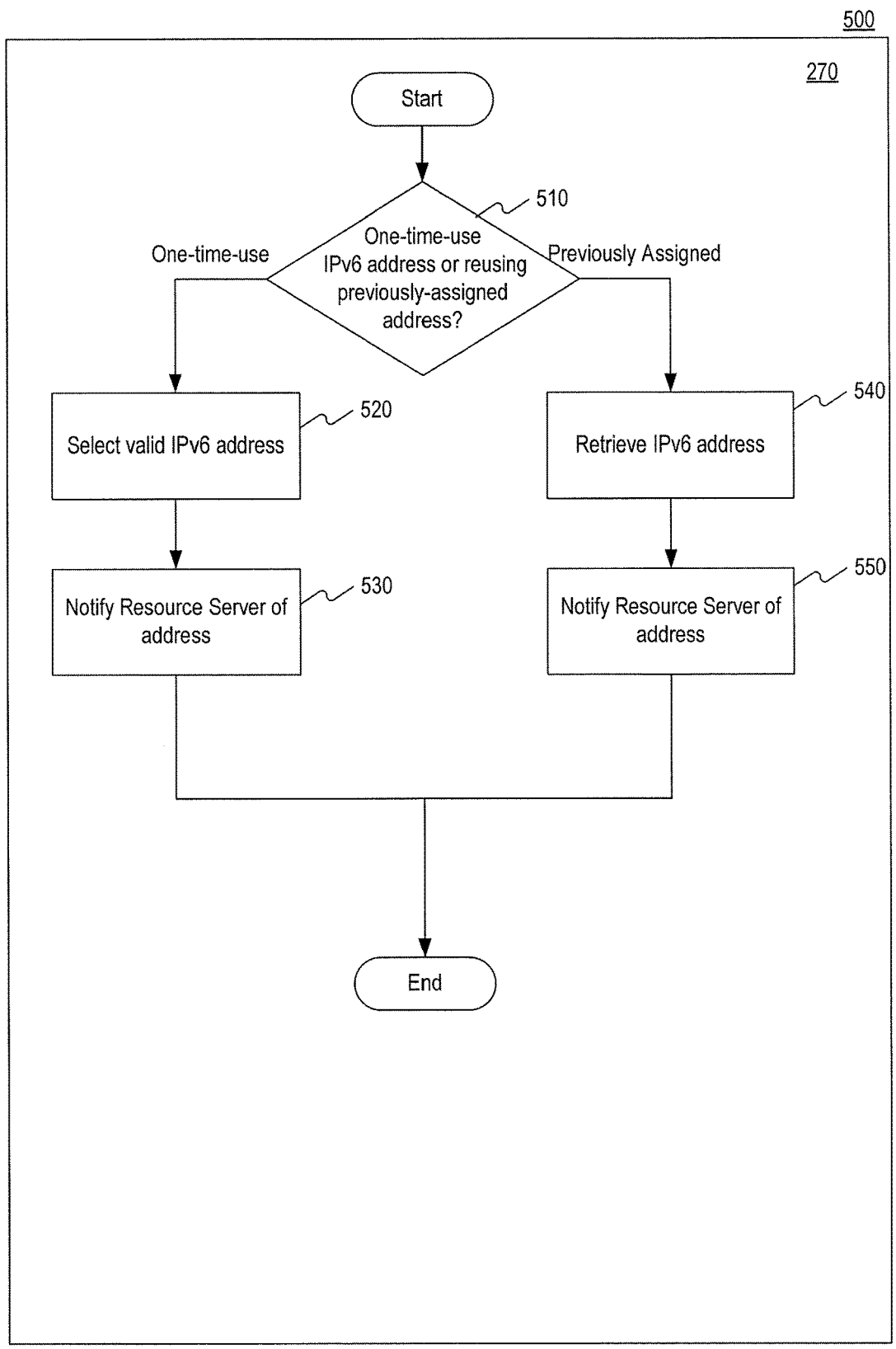
FIG. 5 illustrates an exemplary process of using IPv6 addresses in a DNS response based on user authentication.

FIG. 5 illustrates an exemplary process (500) of using IPv6 addresses in a DNS response based on user authentication corresponding to exemplary step 270. Because the IPv6 address space is so vast, in one embodiment, individualized IPv6 addresses may be returned as the DNS response. Whereas the traditional IP address space (IPv4) contains a total number of theoretical addresses as 4,394,967,296 addresses, the number of theoretical IPv6 addresses is $10^{28}$ times larger. To be sure, over 4 trillion IP addresses is a lot of addresses, but because of architecture limitations, the actual number of available addresses is significantly less. IPv6 addresses add so many available IP addresses, that each person on the earth could have almost 8 million trillion IP addresses. Authenticated DNS resolution is poised to take advantage of the large IP address space by utilizing individualized IPv6 responses. One skilled in the art would understand that the exemplary embodiments described below with respect to IPv6 addresses could equally apply to any name to network layer identifier or service location identifier resolution processes.

Each DNS response may be individualized based on the user accessing the resource. For example, in one variation, the DNS service may return a permanently assigned IPv6 address corresponding to the user. The IPv6 address may be unique to the user or may be shared amongst two or more users. In another variation, the authenticating DNS server may return a temporary IPv6 address that is only good for a particular length of time or until activity to the IPv6 address times out after a period of inactivity. Once the IPv6 is used, it may either never be used again, or may be recycled to be used in the future. Using a permanent IPv6 or other network layer address has the advantage of creating more easily followed logging of access to the resource. Other embodiments may apply these principles of a permanently or temporarily assigned IPv6 address to both a network layer identifier or service location identifier individually.

Turning back to FIG. 5, step 510 considers whether the response will issue a one-time-use (or seldom used) IPv6 (or network layer identifier or service location identifier) address or a previously assigned (permanent) address. If the process issues a one-time-use address, the authenticating DNS server (120) will select a valid address to return as in step 520. The IP (or network layer identifier or service location identifier) address may be selected from a pool of available addresses or the resource authentication interface (135) or resource server (140) may be queried for an address to respond with. In step 530, the authenticating DNS server (120) may notify the resource server (140) of the address assignment. Then the resource server (140) may provision the IP (or network layer identifier or service location identifier) address on the machine.

If the process issues a previously assigned address, the process is similar. The authenticating DNS server (120) will retrieve the appropriate IP (or network layer identifier or service location identifier) address either from its own authentication cache (125) or may query the resource server (140) for an available address, as in step 540. The previously assigned address may optionally be permanently (or semi-permanently) assigned to a particular user. The determined IP (or network layer identifier or service location identifier) address is then sent to the resource server (140) as in step 550 so that the resource server (140) can provision the IP address on the machine or machines.

One benefit of using individually assigned addresses is that a permanently assigned IP (or network layer identifier or service location identifier) address can be completely obscured from the public. Because only assigned addresses to the resource server (140) are returned to the user's computer, DDoS attacks to the resource server over an assigned address may be mitigated by simply deprovisioning (or unassigning) the address being attacked from the resource server (140).

When individualized IP (or network layer identifier or service location identifier) addresses are used in providing authenticated DNS responses, the resource server (140) may not need any additional authentication schemes. For example, if the resource server (140) is a bank website, additional login credentials may be required, but if the resource server (140) requires less security, such as with a cloud based music service, ecommerce site, or customized portal, for example, then additional authentication may not be necessary. In this case, the resource server could tell identity simply by recognizing which IP (or network layer identifier or service location identifier) address was used in accessing the resource. When a user stops using the resource server (140) for a certain period of time, on request (e.g., "logout"), or in response to another set of circumstances, the resource server (140) may deprovision the IP (or network layer identifier or service location identifier) address.

In an embodiment, rather than provisioning a dedicated IP (or network layer identifier or service location identifier) address on the resource server, the source IP address of an authenticated user may be added to a whitelist in a firewall placed between the resource server and user access. In this way, the firewall acts as a buffer to help protect the resource server from unwanted intrusion. Even if the IP address of the resource server becomes publicly known, exposing the IP address to potential DDoS attacks and the like, the firewall may block all traffic unless a specific security policy exists for a particular source IP address (or other identifying feature) of an authenticated user. Other embodiments may combine the ability to dynamically set a security policy on a firewall and the ability to provision IP addresses or other network layer addresses on a resource server.

One skilled in the art will appreciate that additional networking devices may be used in conjunction with the embodiments described herein. For example, the architecture may also use a load balancer to distribute demand to a multitude of resource servers. In this case, an IP address may be provisioned on the load balancer along with a policy directing which resource server to forward traffic to. The IP address may also be provisioned on the identified resource server. Other variants of common networking architecture schemes incorporating the embodiments described herein would by apparent to one of ordinary skill.

In an embodiment that utilizes classification of authenticated users such as those tracked in step 430, classifications may be used to give a user a particular level of access. For example, members of a website that may be classified into "silver," "gold," and "platinum" members may be given different levels of access simply based on the IP (or network layer identifier or service location identifier) address that is accessed. In a mobile phone network, mobile phones may be classified into different priority classes corresponding to emergency personnel, government workers, first responders, and normal users. In a disaster area, first responders and emergency personnel, for example, may be given prioritized access to mobile networks to keep their communication channels open.

Figure 6:
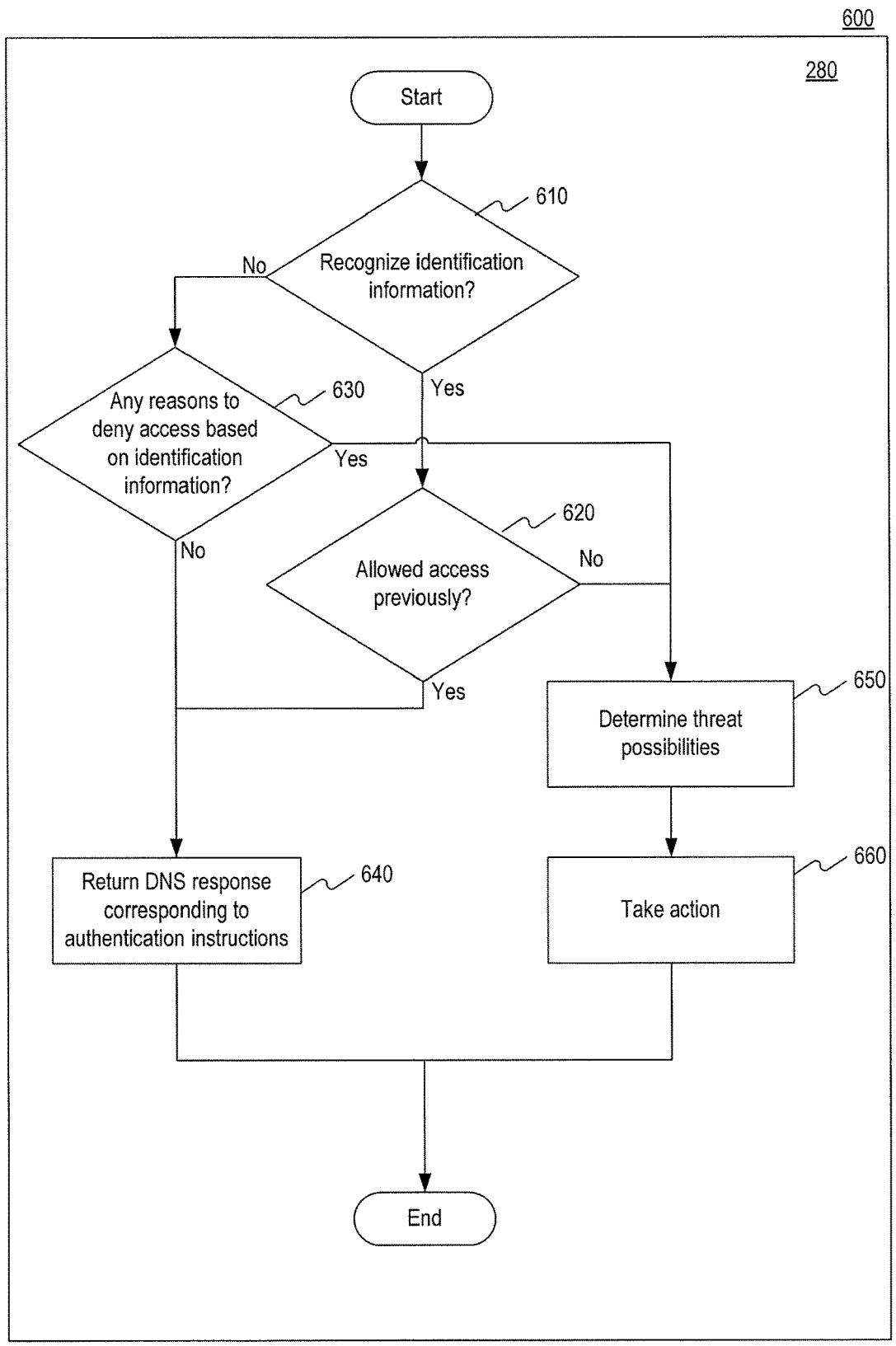
FIG. 6 illustrates an exemplary process of providing a security response based on missing, unexpected, or invalid authentication information.

FIG. 6 illustrates an exemplary process (600), corresponding to exemplary step 280, of providing a security response or action based on missing, unexpected, or invalid authentication information. In step 610, identification information is analyzed to determine if it is recognized. This identification information may be any information to assist in identifying the user submitting the DNS resolution request, and may include incorrect or invalid authentication information or a source IP address. If the identification information is recognized, the process may determine if the user has previously been allowed access in step 620. The authenticating DNS server (120) may query the resource server (140), data store (130), or another logging system where connections have been logged to determine whether the user has previously been allowed access.

If the user was not recognized, the process may determine whether any reasons exist to deny access based on the identification information as in step 630. For example, the process may compare the source IP address with known blacklists or perform a geolocation on the source IP address. If the IP address has been blacklisted, then the process may determine to deny access to the user. Or if the IP address geocodes to a country or area not serviced by the resource server, then the process may determine to deny access to the user. A default policy may be implemented to always deny unknown users pending further determination as explained below. If no reason can be found to deny access, then the process may, in step 640, return an IP address corresponding to an identifier and location where the user may obtain authentication instructions. For example, a user accessing www.example.com may be unrecognized, but the authentication system determines that the user should be provided instructions on how to authenticate. In this case, the authenticating DNS server may respond with an IP address that serves a special version of the www.example.com website, constituting prominent authentication instructions.

Turning back to step 620, if the identified user was previously denied access, then the threat possibilities may be determined in step 650 and actions taken in step 660. If the identified user was previously allowed access, but for some reason the authentication information is invalid, the user may be directed to a specialized version of the requested resource by a different IP address corresponding to authentication instructions as in step 640. Likewise, turning back to step 630, if reasons were determined to deny access, such as when the source IP address was found on a blacklist, when the source IP address corresponds to a location not serviced by the resource server, or when a general policy is in place to deny all unknown traffic, then the threat possibilities associated with the DNS request may be determined in step 650 and actions taken in step 660.

Step 650 may consider a number of threat possibilities. In the case where access was previously denied for a source IP address, such behavior may indicate that the source IP address (user's computer (110)) is attempting to offer different forms of authentication information in order to defeat the authentication scheme. In the case where authentication information is invalid, because one piece is of information is different than expected, such behavior may indicate that a piece of equipment on the network has been taken over without the owner's permission. For example, if a source IP address is different than expected, but other authentication information is present, then the machine may have been stolen and connected to another network.

Based on the various threat possibilities, the process may take appropriate action in step 660. Such action may include, simply not responding; delaying the response and optionally increasing the delay with each subsequent DNS query from the same IP address; responding with an alternative IP (or network layer identifier or service location identifier) address corresponding to a special version of the resource, corresponding to authentication instructions; responding with an alternative IP (or network layer identifier or service location identifier) address corresponding to a special version of the resource, configured to look just like the resource; or responding with an alternative IP (or network layer identifier or service location identifier) address corresponding to a special version of the resource, configured to provide an alternative means of authentication, wherein the resource authentication interface may be updated as a result to allow further unhindered access.

For example, a user determined to be malicious may be served an IP address corresponding to a special version of the resource that looks and feels just like the true resource. The special version may collect data about the malicious user, then terminate its connection with the malicious user and analyze the data. In another example, a user may access a bank website from a particular IP address or machine for the first time. The bank may offer the user an alternative means of authentication, and, once authenticated, update the authentication information in the store (130) or in the resource server (140).

As discussed above, some DNS servers will cache DNS responses from the authenticating DNS server (120). Due to the integrity of the authenticating DNS server, caching may be undesirable. One way to prevent caching is by setting the time-to-live (TTL) in the response to 0, indicating that the response should not be cached. Another way to prevent caching is to encrypt the DNS response. The user's computer could have a public key corresponding to the authenticating DNS server's (120) private key. The authenticating DNS server may encrypt the response using the private key, which would be decrypted using the public key at the user's computer. Because the response would have been encrypted, a caching DNS server could not cache the response, or would not be able to resolve the ultimate response associated with the query. Caching corresponding to the root servers and TLD name servers (or other servers in the delegation graph) could still be done. Another alternative way of maintaining integrity of the authentication status is to cache the DNS at an authentication aware caching server. A DNS caching server that is authentication aware, could perform a basic query to the authenticating DNS server (120) or the resource authentication interface (135) to determine whether the authentication was still valid prior to serving the response. If invalid, the cached response would be flushed and the request made to the authenticating DNS server (120), processed in accordance with the processes discussed above.

Figure 7:
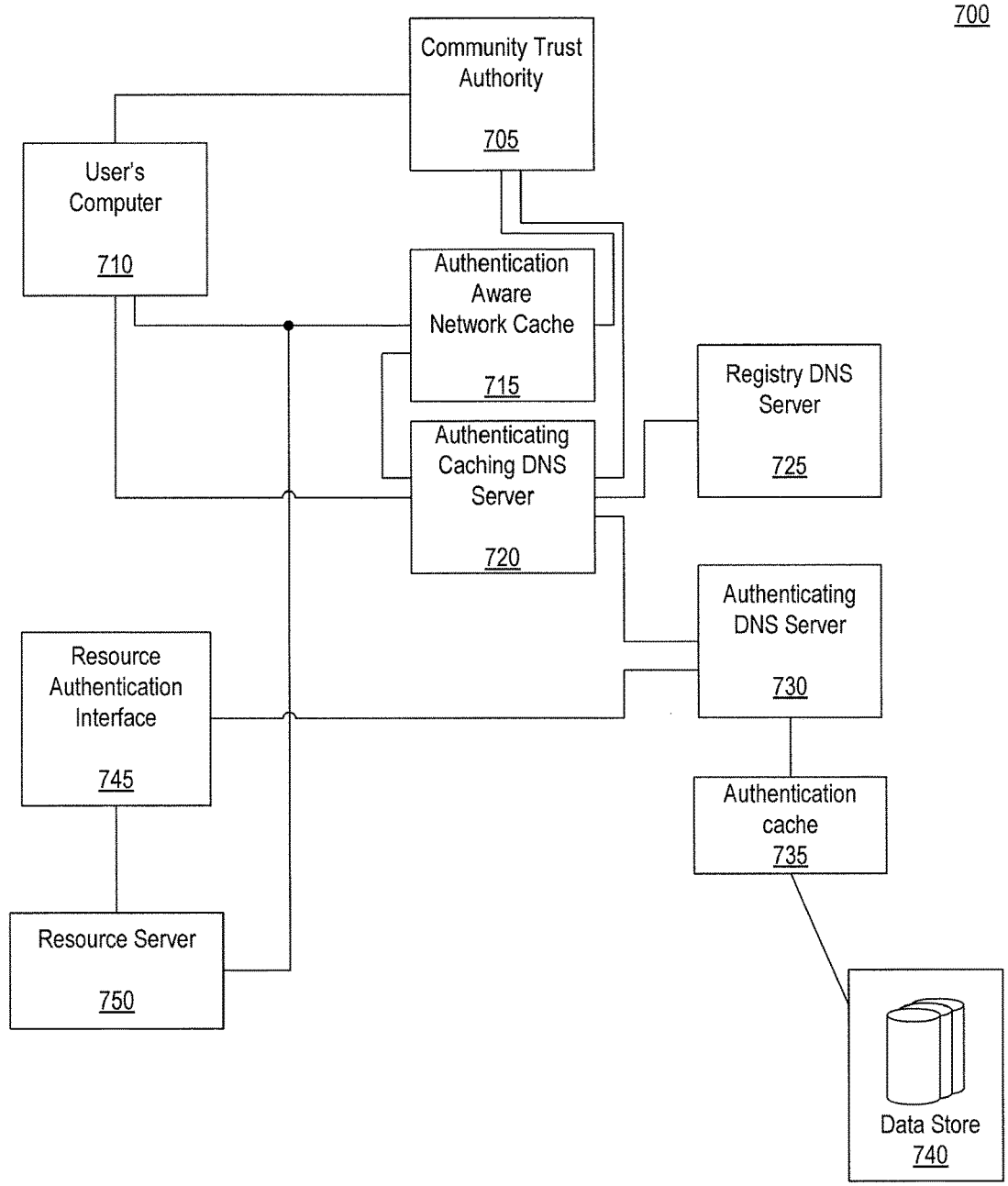
FIG. 7 illustrates an exemplary architecture demonstrating components that may be used to implement an authenticated resolution platform including a community trust authority.

FIG. 7 illustrates an exemplary architecture (700) demonstrating computer and networking components of an authenticated resolution platform corresponding to an embodiment utilizing a federated trust model according to a community-based policy management system. A community trust authority (705) may issue an authentication certificate to a user's computer (710) based on identification information provided when joining the community. Using the certificate as authentication information, the user's computer may request a resource at a particular fully qualified domain name (or a local network name). The request may be routed through an authentication aware network cache (715). The DNS resolution request may likewise be routed through an authenticating caching DNS sever (720). The caching server may then either pass the authentication request from the user's computer (710) on to the authenticating DNS server (730) or may compose a new set of authentication information to authenticate on behalf of the user's computer. If necessary, the caching DNS server may first query the root server (not shown) and registry DNS server (725) to obtain necessary authoritative nameserver information to locate the authenticating DNS server (730). The authenticating DNS server may use an authentication cache (735) and data store (740) to assist in the management of authentication. The authenticating DNS server (730) may connect to a resource authentication interface (745) if necessary to determine whether the authentication information is valid. Notably, the resource authentication interface (745) may be attached to the resource server, attached (not shown) to the community trust authority (705), or attached to both. Once authenticated, the authenticating DNS server (730) may return the DNS response to the authenticating caching DNS server (720), which would, in turn, return the response to the user's computer (710). The user's computer may then request the resource from the resource server (750), the authentication aware network cache (715), or a combination of the two.

One skilled in the art will appreciate that the architecture of FIG. 7 is merely exemplary. Other networking devices may be incorporated to manage traffic. In particular, one skilled in the art would recognize that firewalls, load balancers, additional mirrored servers (name server, resource server, and authentication interfaces), and certain name server caches may be incorporated into the network design and architecture. Further, one skilled in the art will recognize that additional hierarchical DNS servers may be queried, e.g., secure.www.example.com, and that interfaces and servers may be combined to be on one physical machine. Further still, one skilled in the art will recognize that supporting hardware may also be incorporated into the architecture, such as data stores and other memory devices.

Figure 8:
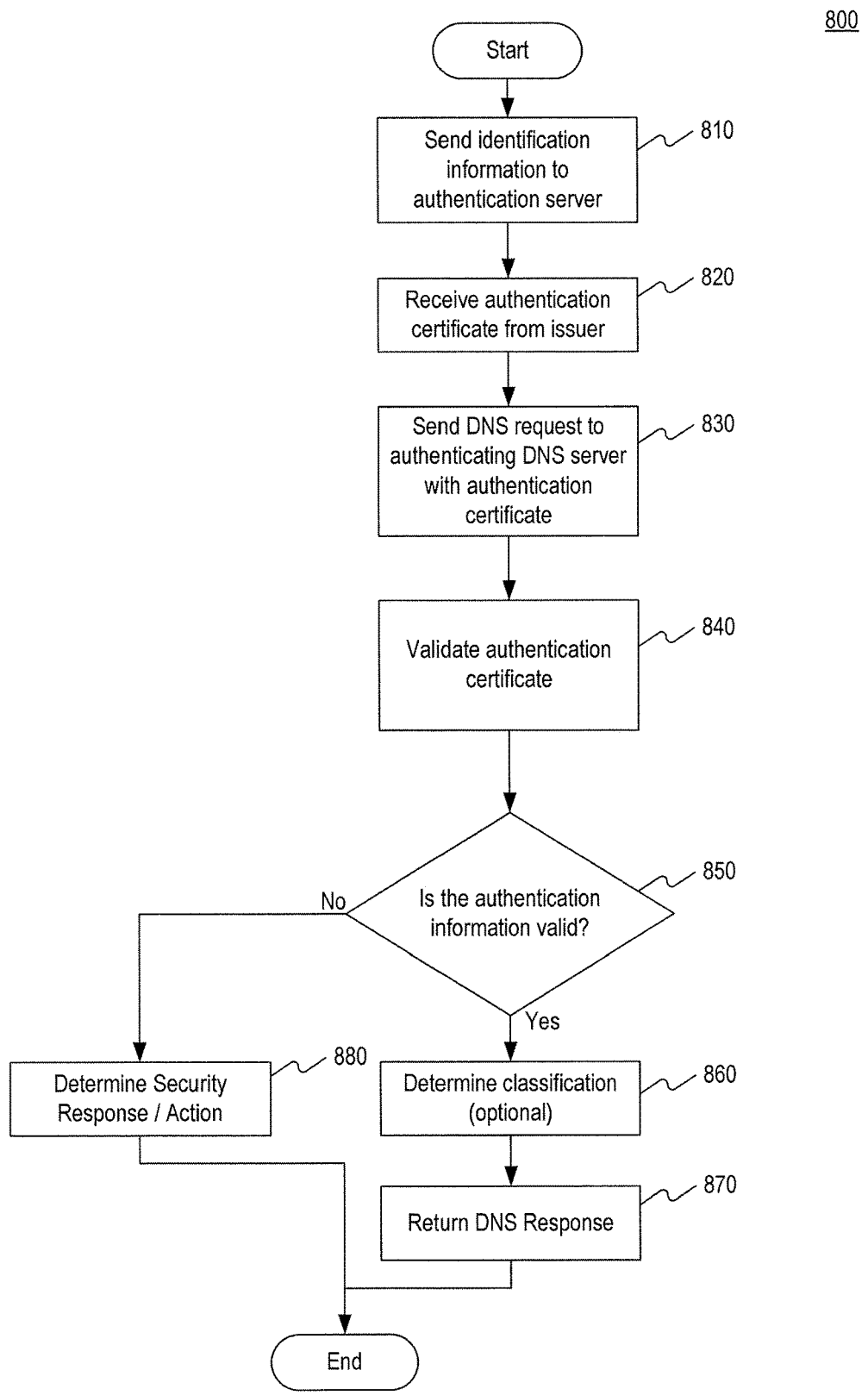
FIG. 8 illustrates an exemplary process of using an authentication certificate obtained from a community trust authority to request an authenticated name resolution.

FIG. 8 illustrates an exemplary process (800) of using authentication certificates in a federated network trust in an authenticating name request process. In step 810, the user is sends identification information to a community trust authority (705) to request an authentication certificate validating the identification information. In an embodiment the authentication certificate may also contain information regarding permissions associated with the authentication certificate. The community trust authority (705) may return the authentication certificate to the user, as in step 820. One skilled in the art will understand that the community trust authority (705) may be a server located within a closed network or a server located on the Internet, depending on the application of the community.

In step 830, a DNS request is sent by the user's computer to an authenticating DNS server (730) using the issued authentication certificate. In step 840, the authenticating DNS server may seek to validate the authentication certificate. Generally, either the authenticating DNS server will either recognize and trust the certificate issuer or will not trust the certificate issuer. In step 850, the authenticating DNS server (730) may determine whether the authentication information is valid based on the trust status of the certificate issuer and further based on a validation process of the certificate. If valid (and trusted), the authentication certificate may be used to deliver a user specific/class specific DNS response. In step 860, the user may be classified into a group or class of recognized users. To do so, the authenticating DNS server (730) may query the resource authentication interface (745) if the authenticating DNS server does not have classification information in its cache (735). In step 870, an appropriate DNS response is returned and may be based on the identification information contained within the authentication certificate. If the authentication certificate was not validated or trusted, the authenticating DNS server (730) may determine an appropriate security response or action as in step 880.

One will appreciate that certain of the exemplary steps illustrated in process 800 parallel the exemplary steps illustrated in process 200. Thus, the specific exemplary processes found in FIGS. 3-6 may be applied to the processes found in FIG. 8 as appropriate.

In another embodiment, the previously discussed embodiments may be combined with a process of capturing and logging the DNS requests and responses based on the authentication result of the requestor. As discussed above, the authenticating DNS server (120 or 730) may be able to determine whether a response to a particular IP address was issued before the handling of a current request, e.g., steps 610 and 620 of process 600 found in FIG. 6. The authenticated DNS requests and responses may be categorized and logged. For example, a DNS request may include identification information which indicates that the requestor is on a blacklist. In this case, the request, identification information, and the corresponding appropriate DNS response (if any) may be logged. Likewise, a DNS request may include identification information which is validated, resulting in an appropriate DNS response. This information may also be logged. Indeed, all information corresponding to DNS requests and responses may be logged. The logged information may be analyzed for data trends pertaining to successful and unsuccessful authenticated DNS requests. For example, the logged information may be analyzed to determine whether IP addresses should be blacklisted after being repeatedly denied authentication, thereby improving efficiency of the overall authentication scheme.

A benefit of utilizing authenticated name resolution is that resolution requests may be categorized for billing purposes. For example, using the logging information or via another logging process done in real time, each of the requests may be categorized into legitimate requests or attack requests. The client utilizing the authentication service may then be billed according to one or both of those categories. Without authenticated resolution, a nameserver typically has difficulty charging on query volume because there is no way to know (or it would be too difficult to determine) whether the owner of the resource authorized a name request. But with the authenticating resolution framework, name requests may be billed both on volume authenticated as well as on a volume saved by denying a DNS response. For the volume authenticated, the billing may represent a volume portion of a fee to provide authenticated name resolution services. For the volume saved, the billing may represent a theoretical volume of traffic saved by hindering access to the resource server by denying a name request. Of course, billing for either of these is optional. Additionally, other categories of authenticated response may be billed on. For example, name resolution requests that are diverted to a server describing how to authenticate may be considered legitimate traffic and part of the authentication volume, even if the user is never actually authenticated.

Billing services may be incorporated within the authentication process itself, by, for example, categorizing each name lookup as a particular billing event at the same time a response is formed. Or billing services may be determined via log analysis on a periodic basis by categorizing each logged query ex post.

Other embodiments of the disclosure will be apparent to those skilled in the art from consideration of the specification and practice of the embodiments disclosed herein. In particular, it should be appreciated that the processes defined herein are merely exemplary, and that the steps of the processes need not necessarily be performed in the order presented. It is intended that the specification and examples be considered as exemplary only, with a true scope and spirit of the embodiments being indicated by the following claims.

What is claimed is:

1. A method for authenticating a DNS request, comprising:
   receiving at an authenticating server comprising an electronic processor a DNS resolution request including a domain name and authentication information, wherein the information is not in the domain name, and wherein the authentication information comprises at least one of a username/password combination, or a security certificate;
   validating, on the authenticating server comprising an electronic processor, the authentication information;
   determining, by the authenticating server comprising an electronic processor, a DNS action based on the validation of the authentication information, wherein the DNS action comprises at least one of: sending a response message with an IP address, network layer identifier, or service location identifier; delaying sending a response message; sending a response message with an IP address corresponding to a website address containing authentication instructions; or responding with an alternative IP address corresponding to a special version of a resource configured to look just like the resource; and
   executing, on the authenticating server comprising an electronic processor, the DNS action.

2. The method of claim 1, wherein authentication information is added to the DNS resolution request by a device other than a device that originates the DNS resolution request.

3. The method of claim 1, wherein the DNS resolution request further includes one or more of: a source network layer address, an encrypted data package, or hardware identification information.

4. The method of claim 1, comprising:
   receiving, at the authenticating server, authentication information from a resource server for a particular user; and
   updating the authenticating server to store the authentication information.

5. The method of claim 1, wherein the IP address, network layer identifier, or service location identifier corresponds to a one-time-use address.

6. The method of claim 1, wherein the IP address, network layer identifier, or service location identifier corresponds to an address assigned to a particular user.

7. The method of claim 1, wherein delaying sending a message comprises:
   determining that a DNS request was received from a particular user previously;
   determining that a DNS response was delayed for a first time period; and
   delaying sending a message by a second time period, wherein the second time period is greater than the first time period.

8. The method of claim 1, comprising:
   determining a prioritized list of classes of users, wherein higher priority classes receive access to services first or a higher quality of services; and
   classifying a user based on the authentication information into a class in the prioritized list of classes,
   wherein the DNS action comprises: sending a response message with an IP address corresponding to a server delivering a particular class.

9. The method of claim 1, comprising:
   determining a billing event based on the validation of the authentication information, and
   billing a client based on the billing event.

10. A system for authenticating a DNS request, comprising:
    an authenticating server comprising:
    a processor; and
    memory, wherein the memory contains instructions, which, when executed by the processor, perform a method comprising:
       receiving at an authenticating server a DNS resolution request including a domain name and authentication information, wherein the information is not in the domain name, and wherein the authentication information comprises at least one of a username/password combination, or a security certificate;
       validating, on the authenticating server, the authentication information;
       determining, by the authenticating server, a DNS action based on the validation of the authentication information, wherein the DNS action comprises at least one of: sending a response message with an IP address, a network layer address or service location address, delaying sending a response message, sending a response message with an IP address corresponding to a website address containing authentication instructions, or responding with an alternative IP address corresponding to a special version of a resource configured to look just like the resource; and executing, on the authenticating server, the DNS action.

11. The system of claim 10, wherein authentication information is added to the DNS resolution request by a device other than a device that originates the DNS resolution request.

12. The system of claim 10, wherein the DNS resolution request further includes one or more of: a source network layer address, an encrypted data package, or hardware identification information.

13. The system of claim 10, wherein the method comprises:

receiving, at the authenticating server, authentication information from a resource server for a particular user; and updating the authenticating server to store the authentication information.

14. The system of claim 10, wherein the IP address, the network layer address or service location address corresponds to a one-time-use address.

15. The system of claim 10, wherein the IP address, the network layer address or service location address corresponds to an individualized address assigned to a particular user.

16. The system of claim 10, wherein delaying sending a message comprises:

determining that a DNS request was received from a particular user previously;

determining that a DNS response was delayed for a first time period; and delaying sending a message by a second time period, wherein the second time period is greater than the first time period.

17. The system of claim 10, wherein the method comprises:

determining a prioritized list of classes of users, wherein higher priority classes receive access to services first or a higher quality of services; and classifying a user based on the authentication information into a class in the prioritized list of classes, wherein the DNS action comprises: sending a response message with an IP address corresponding to a server delivering a particular class.

18. The system of claim 10, wherein the method comprises:

determining a billing event based on the validation of the authentication information, and billing a client based on the billing event.

19. Non-transitory computer-readable media containing instructions, which, when executed by a processor, perform a method comprising:

determining a prioritized list of classes of users, wherein higher priority classes receive access to services first or a higher quality of services;

classifying a user based on the authentication information into a class in the prioritized list of classes;

receiving at an authenticating server a DNS resolution request including authentication information, wherein the authentication information comprises at least one of a username/password combination, or a security certificate;

validating, on the authenticating server, the authentication information;

determining, by the authenticating server, a DNS action based on the validation of the authentication information, wherein the DNS action comprises at least one of: sending a response message with an IP address, a network layer address or service location address, delaying sending a response message, sending a response message with an IP address corresponding to a website address containing authentication instructions, and responding with an alternative IP address corresponding to a special version of a resource configured to look just like the resource; and executing, on the authenticating server, the DNS action.

20. The non-transitory computer-readable media of claim 19, wherein authentication information is added to the DNS resolution request by a device other than a device that originates the DNS resolution request.

21. The non-transitory computer-readable media of claim 19, wherein the DNS resolution request further includes one or more of: a source network layer address, a username/password combination, an encrypted data package, a security certificate, or hardware identification information.

22. The non-transitory computer-readable media of claim 19, wherein the method comprises:

receiving, at the authenticating server, authentication information from a resource server for a particular user; and updating the authenticating server to store the authentication information.

23. The non-transitory computer-readable media of claim 19, wherein the IP address, the network layer address or the service location address comprises an individualized network layer address or service location address corresponding to a one-time-use address.

24. The non-transitory computer-readable media of claim 19, wherein the IP address, the network layer address or the service location address comprises an individualized network layer address or service location address corresponding to an address assigned to a particular user.

25. The non-transitory computer-readable media of claim 19, wherein delaying sending a message comprises:

determining that a DNS request was received from a particular user previously;

determining that a DNS response was delayed for a first time period; and delaying sending a message by a second time period, wherein the second time period is greater than the first time period.

26. The non-transitory computer-readable media of claim 19, wherein the DNS action comprises: sending a response message with an IP address corresponding to a server delivering a particular class.

27. The non-transitory computer-readable media of claim 19, wherein the method comprises:

determining a billing event based on the validation of the authentication information, and billing a client based on the billing event.

28. A method for authenticating a DNS request, comprising:

receiving, at an authenticating server comprising an electronic processor, a DNS resolution request from a user, wherein the request includes a domain name to be resolved and an authentication certificate, wherein the authentication certificate was issued by a community authority trust in response to a request for identification authentication by the user, and wherein authentication certificate was added to the DNS resolution request by a device other than a device that originates the DNS resolution request;

validating, on the authenticating server comprising an electronic processor, the authentication certificate;

determining, by the authenticating server comprising an electronic processor, a network layer address or service location address based on the validation of the authentication certificate; and sending the network layer address to the user.

29. The method of claim 28, wherein the authentication certificate indicates the authentication of a group of users.

30. The method of claim 28, wherein the DNS resolution request also includes certificate authority credentials of the community authority trust.

31. The method of claim 28, wherein the authentication certificate contains permission data corresponding to the DNS resolution request.

32. The method of claim 31, wherein the DNS action comprises:

determining the network layer address or service location address corresponding to the DNS resolution request based on the permission data; and sending a signal to a resource server, wherein the signal causes the resource server to provision the network layer address or service location address.

* * * * *